(12) United States Patent
Uchiumi

(10) Patent No.: US 12,466,746 B2
(45) Date of Patent: Nov. 11, 2025

(54) PRODUCING DEVICE

(71) Applicant: ACT Corporation, Hokkaido (JP)

(72) Inventor: Hiroshi Uchiumi, Hokkaido (JP)

(73) Assignee: ACT CORPORATION, Hokkaido (JP)

( * ) Notice: Subject to any disclaimer, the term of this patent is extended or adjusted under 35 U.S.C. 154(b) by 0 days.

(21) Appl. No.: 18/021,789

(22) PCT Filed: Oct. 27, 2022

(86) PCT No.: PCT/JP2022/040134
§ 371 (c)(1),
(2) Date: Feb. 16, 2023

(87) PCT Pub. No.: WO2023/127265
PCT Pub. Date: Jul. 6, 2023

(65) Prior Publication Data
US 2024/0059592 A1 Feb. 22, 2024

(30) Foreign Application Priority Data
Dec. 28, 2021 (JP) ................... 2021-214707

(51) Int. Cl.
*C02F 1/461* (2023.01)
(52) U.S. Cl.
CPC .... *C02F 1/46104* (2013.01); *C02F 2201/004* (2013.01); *C02F 2201/46115* (2013.01)
(58) Field of Classification Search
CPC .............. C02F 1/46104; C02F 1/46109; C02F 2201/004; C02F 2201/46105; C02F 2201/46115; C25B 9/19
(Continued)

(56) References Cited

U.S. PATENT DOCUMENTS

2016/0186337 A1* 6/2016 Yokota ................. C02F 1/4672
204/252
2018/0290905 A1 10/2018 Taketomi et al.

FOREIGN PATENT DOCUMENTS

JP 2002224671 A 8/2002
JP 2004008983 A 1/2004
(Continued)

OTHER PUBLICATIONS

Office Action issued in Japanese Patent Application No. 2021-214707 dated Aug. 19, 2022 (with English translation).
(Continued)

*Primary Examiner* — Claire A Norris
(74) *Attorney, Agent, or Firm* — TROUTMAN PEPPER LOCKE LLP

(57) ABSTRACT

A producing device includes an electrolytic bath having chambers partitioned via a cathode side diaphragm and an anode side diaphragm; and a diaphragm protecting structure for preventing damage to the cathode side diaphragm and/or the anode side diaphragm. The electrolytic bath includes a pair of cover members each including a concave portion by which the cathode chamber and the anode chamber are compartmentalized from each other; a partition wall having an opening by which the intermediate chamber is compartmentalized, the partition wall being sandwiched between the cover members via a cathode, an anode, the cathode side diaphragm, and the anode side diaphragm; and seal members, each watertightly closing a gap between the cover member and the partition wall. The diaphragm protecting structure includes protrusions formed to protrude from the seal members into the chambers beyond an edge of the concave portion or an edge of the opening.

8 Claims, 12 Drawing Sheets

(58) Field of Classification Search
USPC .................................... 204/252; 210/748.01
See application file for complete search history.

(56) References Cited

FOREIGN PATENT DOCUMENTS

| | | |
|---|---|---|
| JP | 2006255684 A | 9/2006 |
| JP | 2008196014 A | 8/2008 |
| JP | 2016016346 A | 2/2016 |
| JP | 2016016360 A | 2/2016 |
| JP | 2017056376 A | 3/2017 |
| JP | 2018030042 A | 3/2018 |
| JP | 2018030045 A | 3/2018 |
| TW | 201713600 A | 4/2017 |
| WO | 2016043109 A1 | 3/2016 |

OTHER PUBLICATIONS

Office Action issued in Taiwanese Application No. 111146408 dated Aug. 10, 2023.

\* cited by examiner

PRODUCING DEVICE

CROSS REFERENCES TO RELATED APPLICATIONS

The present application is a U.S. National Phase Application under 35 U.S.C. § 371 of International Patent Application No. PCT/JP2022/040134, filed Oct. 27, 2022, which claims priority of Japanese Patent Application No. 2021-214707, filed Dec. 28, 2021. The entire contents of which are hereby incorporated by reference.

TECHNICAL FIELD

The present invention relates to a producing device that produces electrolyzed water.

BACKGROUND

Conventionally, there is a known electrolyzed-water producing device as described in, for example, JP 2016-16346 below.

In this conventional electrolyzed-water producing device, an electrolytic bath is formed by a pair of cover members that house electrodes and a partition wall sandwiched between these cover members. The electrolytic bath is partitioned into two or three chambers through a first diaphragm and a second diaphragm. By energizing each electrode, electrolyzed water is produced.

SUMMARY

The electrolyzed-water producing device described above cannot appropriately produce electrolyzed water if the diaphragm is broken or otherwise damaged, thus requiring maintenance such as replacement of the diaphragm. Therefore, it is desirable to prevent damage to the diaphragm over the long term.

The present invention has been made in view of these points, and an object of the present invention is to provide a producing device that can prevent damages to a diaphragm.

A producing device according to the present invention produces electrolyzed water using a pair of electrodes supplied with power and a diaphragm, the producing device including: an electrolytic bath having a plurality of chambers partitioned via the diaphragm; and a diaphragm protecting structure for preventing damage to the diaphragm, wherein the electrolytic bath includes: a pair of cover members each including a concave portion by which the chambers are compartmentalized from each other; a partition wall having an opening by which the chambers are compartmentalized from each other, the partition wall being sandwiched between the cover members via the electrodes and the diaphragm; and a seal member that watertightly closes a gap between the cover member and the partition wall, and wherein the diaphragm protecting structure includes a protrusion formed to protrude from the seal member into the chamber beyond an edge of the concave portion or an edge of the opening.

According to the present invention, damages to the diaphragm can be prevented.

DETAILED DESCRIPTION

A first embodiment of the present invention will be described below with reference to the figures.

Figure 3:
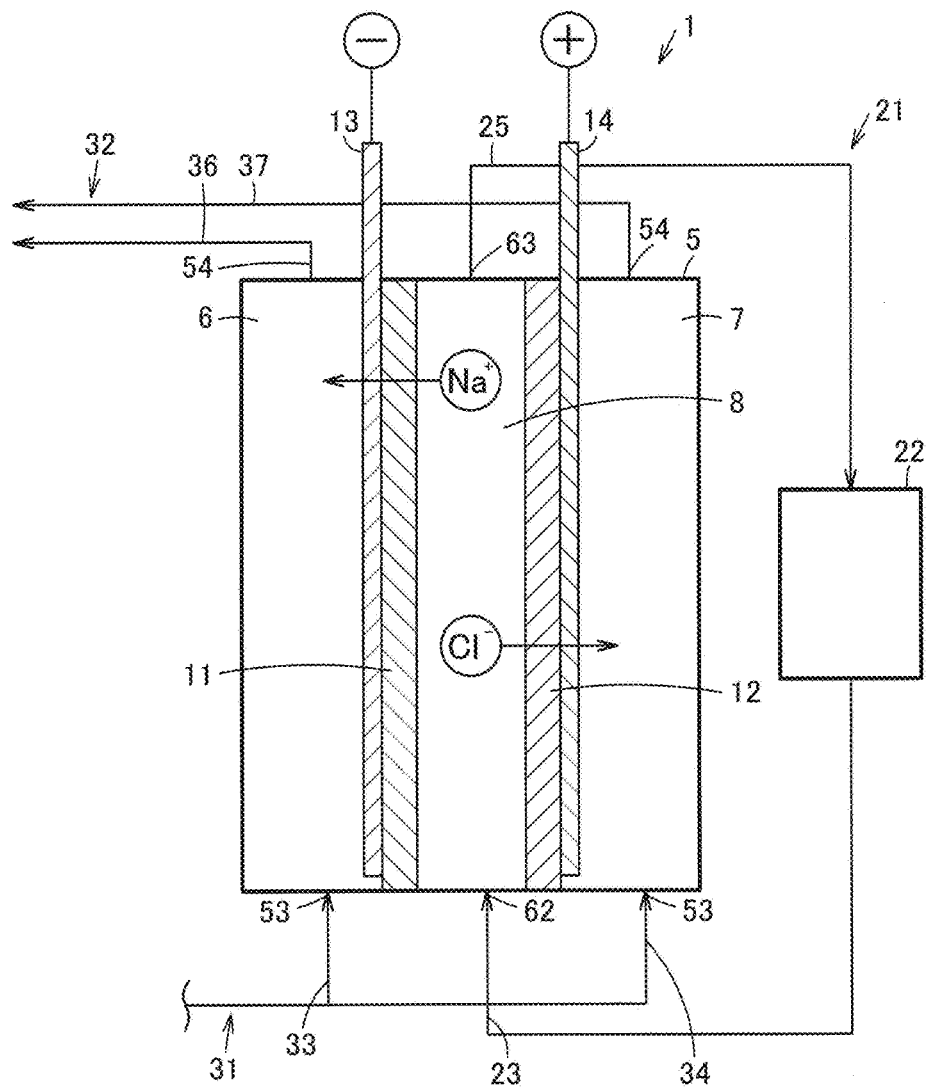
FIG. 3 is an explanatory diagram of the same producing device.

In FIG. 3, reference sign 1 indicates a producing device (electrolyzed-water producing device) that produces electrolyzed water. The producing device 1 is a three-chamber electrolyzer (hypochlorous water producing device) for producing hypochlorous water (electrolyzed sterilization water), which is at least acidic electrolyzed water, by electrolysis of an electrolysis solution, for example, salt water.

The producing device 1 includes a three-chamber electrolytic bath (electrolytic cell) 5. The electrolytic bath 5 has a cathode chamber 6, which is one electrode chamber (first electrode chamber), an anode chamber 7, which is the other electrode chamber (second electrode chamber), and an intermediate chamber 8 located between the cathode chamber 6 and the anode chamber 7.

The cathode chamber 6 and the intermediate chamber 8 are partitioned from each other by a cathode side diaphragm 11 serving as an ion exchange membrane, which is one diaphragm (first diaphragm). The anode chamber 7 and the intermediate chamber 8 are partitioned from each other by an anode side diaphragm 12 serving as an ion exchange membrane, which is the other diaphragm (second diaphragm). That is, the interior of the electrolytic bath 5 is partitioned into the three chambers 6, 7, and 8 by the two diaphragms 11 and 12.

A plate-shaped cathode 13, which is one electrode (first electrode), is provided inside the cathode chamber 6, and the cathode 13 is in close proximity to and faces the cathode side diaphragm 11. A plate-shaped anode 14, which is the other electrode (second electrode), is provided inside the anode chamber 7, and the anode 14 is in close proximity to and faces the anode side diaphragm 12. These cathode 13 and anode 14 are connected to a power supply unit that provides power.

The producing device 1 includes a salt water supply unit 21 that supplies salt water as the electrolysis solution to the intermediate chamber (electrolysis solution chamber) 8 of the electrolytic bath 5.

The salt water supply unit 21 has a tank 22 in which the salt water is stored, a supply pipe 23 through which the salt water in the tank 22 is supplied to the intermediate chamber 8, a pump provided midway of the supply pipe 23, and a return pipe 25 through which the salt water in the intermediate chamber 8 is returned to the tank 22. The present invention is not limited to the circulation-type configuration shown in FIG. 3, but may be, for example, a configuration in which the electrolysis solution does not circulate, or the like.

The producing device 1 further includes: a water supply unit 31 that supplies water, which is electrolytic raw water (e.g., tap water having passed through a water softener, or the like), to the cathode chamber 6 and the anode chamber 7 of the electrolytic bath 5; and an electrolyzed water discharge unit 32 that discharges electrolyzed water produced in the cathode chamber 6 and anode chamber 7 of the electrolytic bath 5 to the outside of the electrolytic bath 5.

The water supply unit 31 has a first supply pipe 33 through which water is supplied to the cathode chamber 6 as the first electrode chamber and a second supply pipe 34 through which water is supplied to the anode chamber 7 as the second electrode chamber.

The electrolyzed water discharge unit 32 has a first discharge pipe 36 and a second discharge pipe 37. Caustic soda water (NaOH aqueous solution), which is alkaline electrolyzed water produced in the cathode chamber 6, is discharged from the first discharge pipe 36. Hypochlorous water (HClO aqueous solution), which is acidic electrolyzed water produced in the anode chamber 7, is discharged from the second discharge pipe 37.

The producing device 1 operates the pump of the salt water supply unit 21 to supply salt water from the supply pipe 23 to the intermediate chamber 8 of the electrolytic bath 5 and also to supply water from the first supply pipe 33 and the second supply pipe 34 of the water supply unit 31 to the cathode chamber 6 and the anode chamber 7 of the electrolytic bath 5, respectively. Simultaneously, negative and positive voltages are applied from the power supply unit to the cathode 13 and the anode 14, respectively.

Sodium ions (Na$^+$) ionized in the salt water that flows into the intermediate chamber 8 are attracted to the cathode 13, pass through the cathode side diaphragm 11, and flow into the cathode chamber 6. Then, in the cathode chamber 6, water is decomposed at the cathode 13, whereby caustic soda water is obtained as described below.

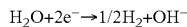
$$H_2O+2e^-\rightarrow 1/2H_2+OH^-$$

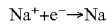
$$Na^++e^-\rightarrow Na$$

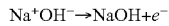
$$Na^+OH^-\rightarrow NaOH+e^-$$

Chlorine ions (Cl$^-$) ionized in the salt water inside the intermediate chamber 8 are attracted to the anode 14, pass through the anode side diaphragm 12, and flow into the anode chamber 7. Then, the chlorine ions are reduced at the anode 14 to generate chlorine gas, which reacts with water in the anode chamber 7 to produce hypochlorous water as described below.

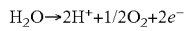
$$H_2O\rightarrow 2H^++1/2O_2+2e^-$$

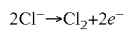
$$2Cl^-\rightarrow Cl_2+2e^-$$

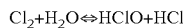
$$Cl_2+H_2O\Leftrightarrow HClO+HCl$$

The caustic soda water produced in this way is discharged from the cathode chamber 6 through the first discharge pipe 36, whereas the hypochlorous water is discharged from the anode chamber 7 through the second discharge pipe 37.

Next, the detailed configuration of the producing device 1 will be described.

Figure 1:
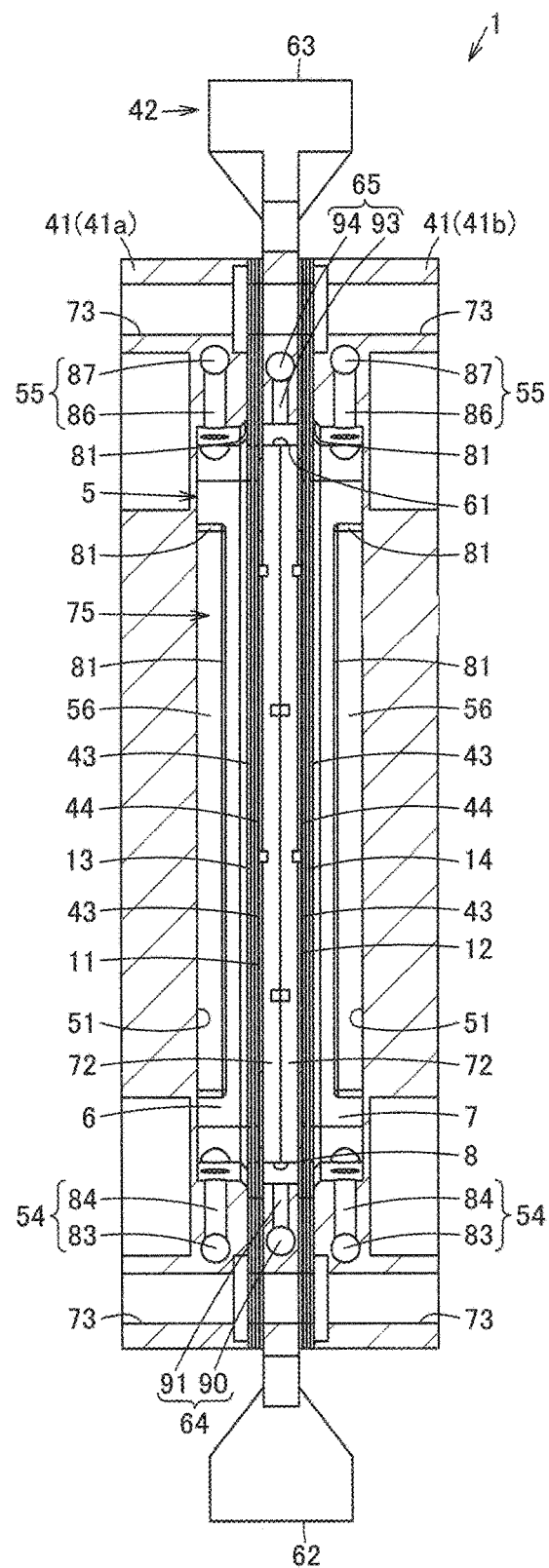
FIG. 1 is a longitudinal-sectional view of a producing device according to a first embodiment.
Figure 2:
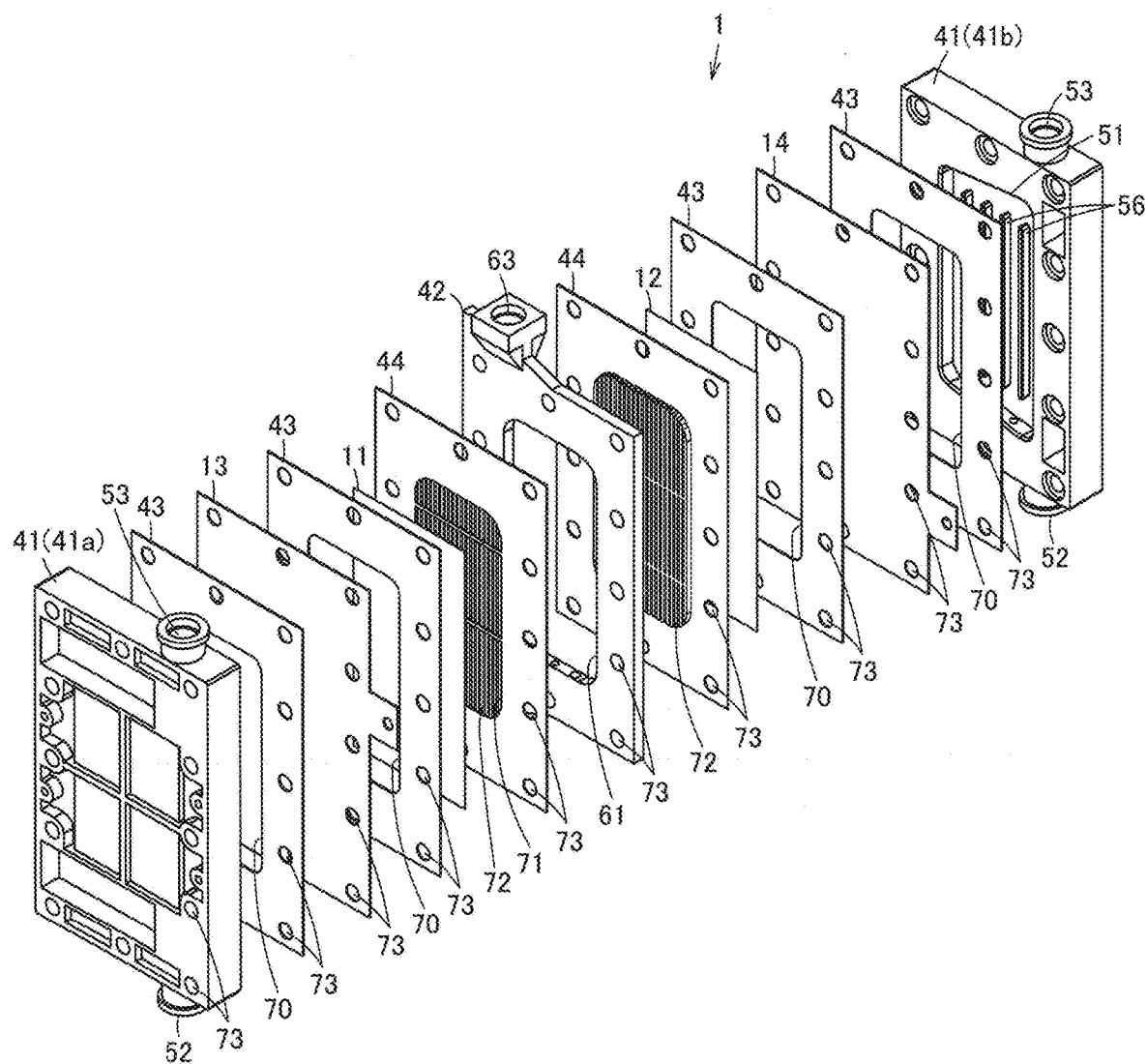
FIG. 2 is an exploded perspective view of the same producing device.

As shown in FIGS. 1 and 2, the producing device 1 is structurally configured by watertightly combining a pair of outer plates 41, which is a pair of cover members, and a partition wall 42 sandwiched between these outer plates 41, via seal members 43 and 44.

A cathode outer plate 41*a* and an anode outer plate 41*b* are set as the outer plates 41. The cathode outer plate 41*a* covers one side surface of the partition wall 42, the cathode side diaphragm 11, and the cathode 13. The anode outer plate 41*b* covers the other side surface of the partition wall 42, the anode side diaphragm 12, and the anode 14. In the present embodiment, the cathode outer plate 41*a* and the anode outer plate 41*b* basically have structures that are symmetrical or substantially symmetrical to each other with the partition wall 42 sandwiched therebetween, and thus these structures will be collectively described as the structure of the outer plate 41 unless otherwise specified.

The outer plate 41 is formed of a synthetic resin or the like into a quadrilateral shape in the front view. The outer plate 41 has a contour identical or substantially identical to that of the partition wall 42. In the present embodiment, the outer plate 41 has a rectangular contour with its longitudinal direction oriented in the vertical direction. The cathode 13 and the cathode side diaphragm 11 are arranged between the cathode outer plate 41*a* and the partition wall 42, and the anode 14 and the anode side diaphragm 12 are arranged between the anode outer plate 41*b* and the partition wall 42. A concave portion 51 is formed at the side surface of the outer plate 41 on the partition wall 42 side. The concave portion 51 is recessed in the thickness direction of the outer plate 41. The concave portion 51 on the cathode outer plate 41*a* forms the cathode chamber 6, and the concave portion 51 on the anode outer plate 41*b* forms the anode chamber 7. In the present embodiment, the concave portion 51 is formed in a quadrilateral shape with its longitudinal direction oriented in the vertical direction. The cathode chamber 6 is compartmentalized between the concave portion 51 of the cathode outer plate 41*a* and the cathode side diaphragm 11, and the anode chamber 7 is compartmentalized between the concave portion 51 of the anode outer plate 41*b* and the anode side diaphragm 12. The cathode 13 and the cathode side diaphragm 11 are located with a size to cover at least the concave portion 51 of the cathode outer plate 41*a*, and the anode 14 and the anode side diaphragm 12 are located with a size to cover at least the concave portion 51 of the anode outer plate 41*b*.

As shown in FIGS. 1 and 3, the outer plate 41 has a supply port 52 formed at its lower portion and a discharge port 53 formed at its upper portion. The supply port 52 is opened downward, and the discharge port 53 is opened upward. The supply port 52 is located below the concave portion 51, and the discharge port 53 is located above the concave portion 51. In the present embodiment, the supply port 52 and the discharge port 53 are located in the positions that are identical or substantially identical to each other in the lateral direction of the outer plate 41. That is, the supply port 52 and the discharge port 53 are located on the same vertical line or substantially on the same vertical line. As shown in FIG. 3, the supply port 52 is connected to the water supply unit 31, and the discharge port 53 is connected to the electrolyzed water discharge unit 32. That is, the supply port 52 and the discharge port 53 of the cathode outer plate 41a are connected to the first supply pipe 33 and the first discharge pipe 36, respectively, and the supply port 52 and the discharge port 53 of the anode outer plate 41b are connected to the second supply pipe 34 and the second discharge pipe 37, respectively.

The supply port 52 and the concave portion 51 are connected by a supply piping structure 54, which is a piping structure, and the concave portion 51 and the discharge port 53 are connected by a discharge piping structure 55, which is a piping structure. The supply piping structure 54 and the discharge piping structure 55 are formed on the respective outer plates 41 in a path shape. With these structures, in the cathode chamber 6 and the anode chamber 7, water is supplied from the bottom, i.e., from the water supply unit 31 via the supply port 52 and the supply piping structure 54, and the produced electrolyzed water is discharged from the top via the discharge piping structure 55 and the discharge port 53. That is, the cathode chamber 6 and the anode chamber 7 are configured such that water is supplied and discharged in the direction along the cathode 13 and the cathode side diaphragm 11 and along the anode 14 and the anode side diaphragm 12, respectively.

Figure 4:
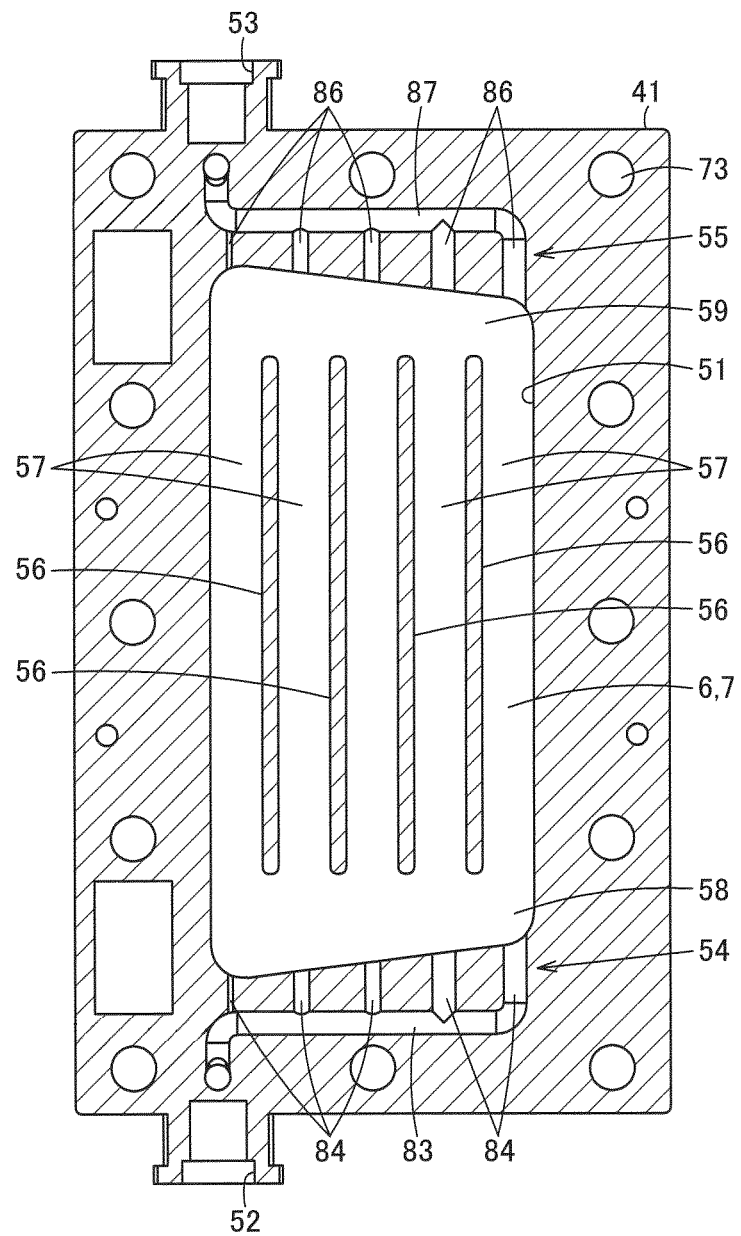
FIG. 4 is a sectional view of a cover member of the same producing device.
Figure 5:
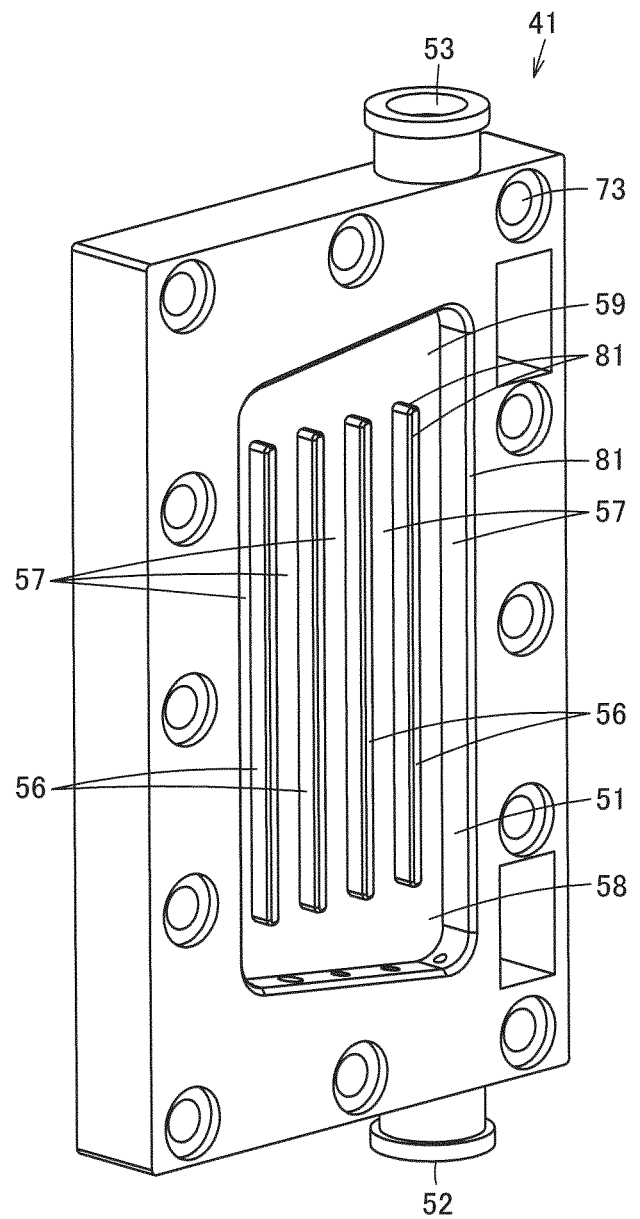
FIG. 5 is a perspective view of the cover member of the same producing device.

Preferably, as shown in FIGS. 4 and 5, the outer plate 41 has branch portions 56 formed to be located within the concave portion 51. The branch portion 56 partitions and branches the interior of each of the cathode chamber 6 and the anode chamber 7 in the direction intersecting or orthogonal to the water supply direction and the electrolyzed-water discharge direction. The branch portions 56 are formed in the longitudinal rib shape that is continuously provided linearly in the longitudinal direction of the concave portion 51, i.e., the vertical direction which is the water supply direction or the electrolyzed-water discharge direction. More preferably, a plurality of branch portions 56 is provided. In the present embodiment, three or more, four in an example shown, of the branch portions 56 are set in the direction intersecting or orthogonal to the water supply direction and the electrolyzed-water discharge direction within the cathode chamber 6 and the anode chamber 7. These branch portions 56 are arranged at equal intervals and in parallel or substantially parallel to each other. The branch portion 56 is located to be spaced apart from the edge of the concave portion 51 in the left-right direction and vertical direction of FIGS. 4 and 5. A branch flow path 57 is formed between the adjacent branch portions 56 and 56, and another branch flow path 57 is formed between the edge of the concave portion 51 and the branch portion 56. A merging portion 58 where the branch flow paths 57 are merged is formed between a lower portion of the branch portion 56 and the edge of the concave portion 51 to extend in the direction intersecting the branch flow path 57. A merging portion 59 where the branch flow paths 57 are merged is formed between an upper portion of the branch portion 56 and the edge of the concave portion 51 to extend in the direction intersecting the branch flow path 57.

Figure 6:
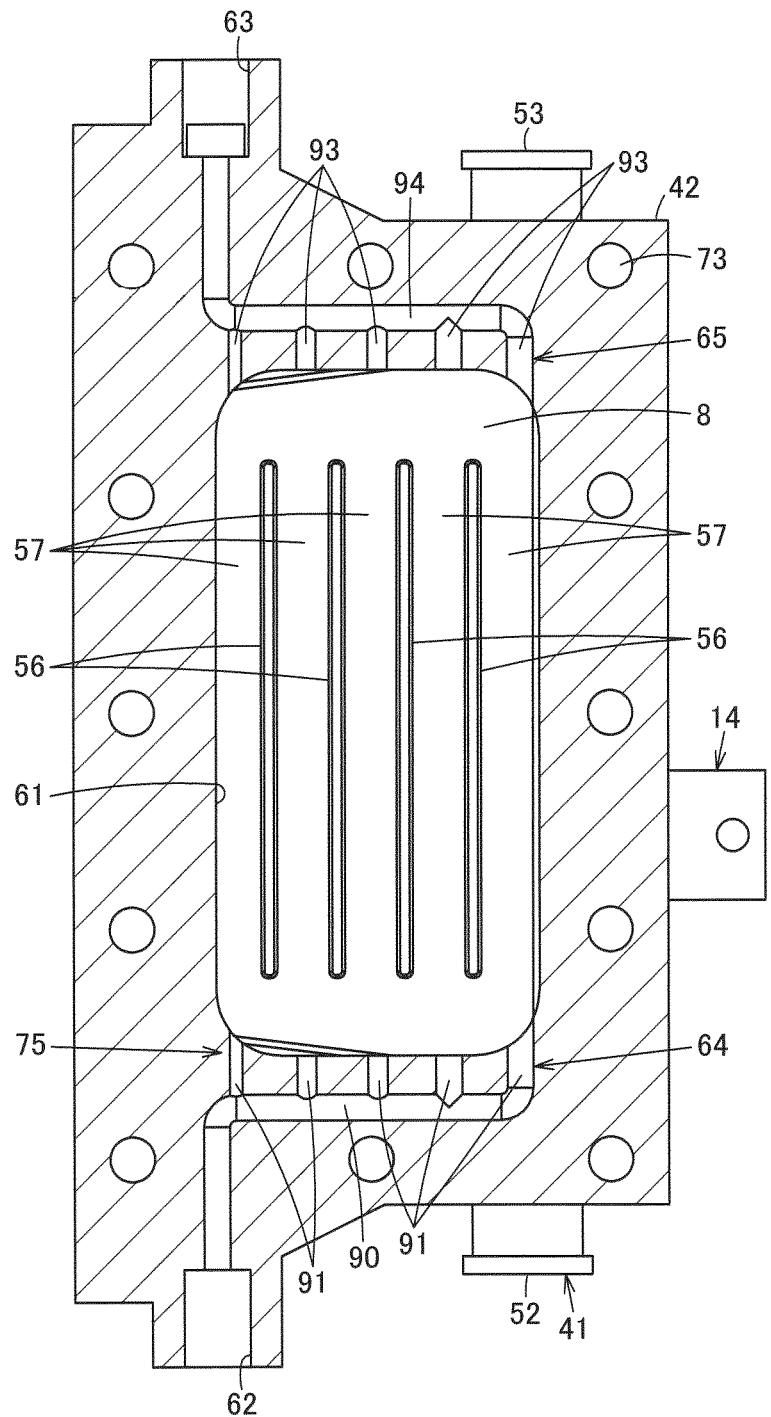
FIG. 6 is a sectional view of a partition wall of the same producing device.
Figure 7:
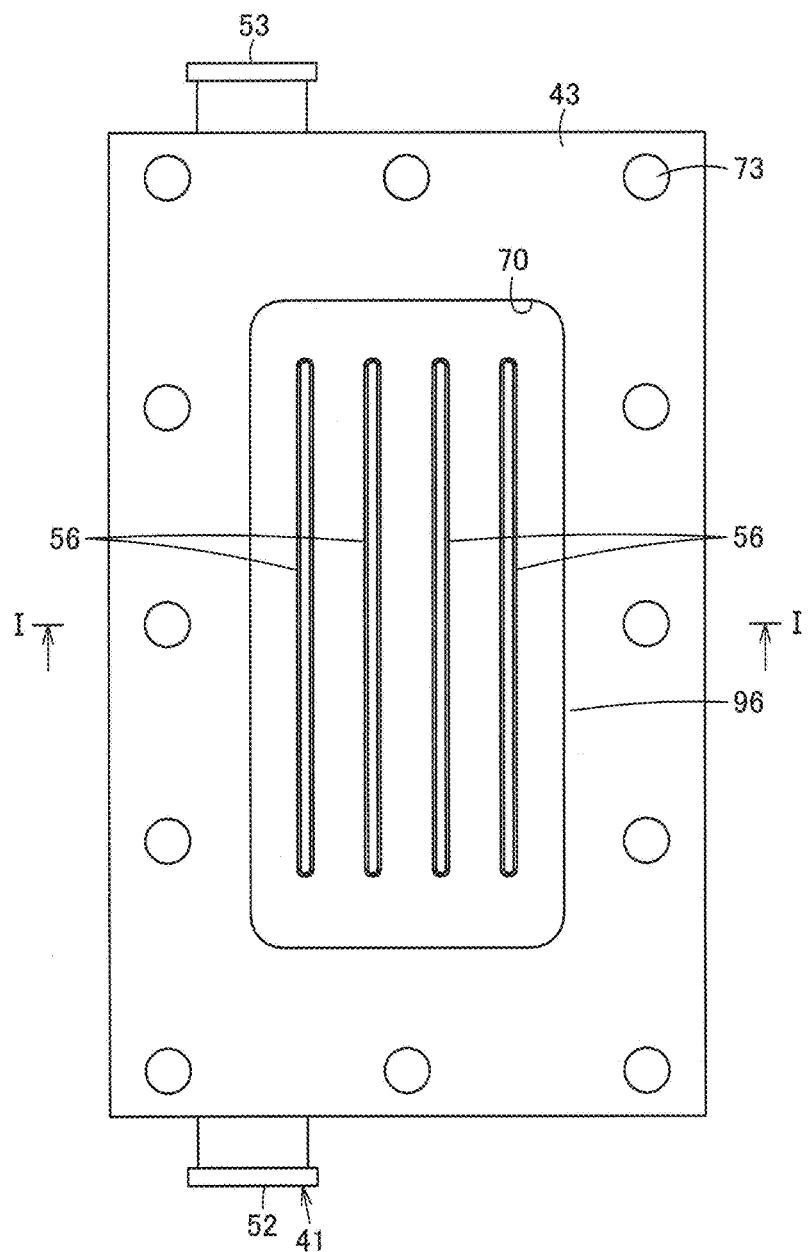
FIG. 7 is a front view of one of the cover members of the same producing device from the partition wall side.
Figure 8:
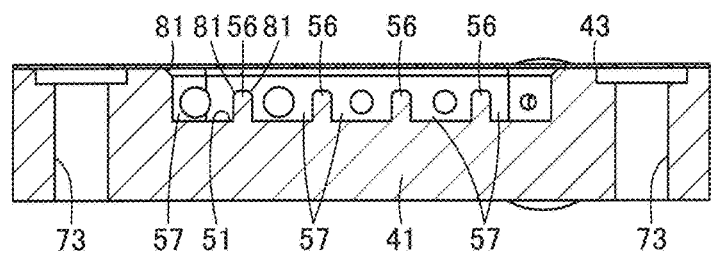
FIG. 8 is a sectional view taken at the position along line I-I of FIG. 7.

The partition wall 42 shown in FIGS. 1, 2, and 6 is an intermediate frame interposed between the cathode outer plate 41a and the anode outer plate 41b. The partition wall 42 is formed of a synthetic resin or the like to have a contour of a quadrilateral shape in the front view. The partition wall 42 has a contour identical or substantially identical to that of the outer plate 41. In the present embodiment, the partition wall 42 has its longitudinal direction oriented in the vertical direction. An opening 61 that penetrates the partition wall 42 from its one side surface to the other side surface in the thickness direction is formed inside the partition wall 42.

The opening 61 forms the intermediate chamber 8. The intermediate chamber 8 is compartmentalized between the opening 61 and the cathode side diaphragm 11 and between the opening 61 and the anode side diaphragm 12. The opening 61 has a contour identical or substantially identical to that of the concave portion 51. By the opening 61, the partition wall 42 is formed in a frame shape or picture frame-shape. The opening 61 is located at the center of the partition wall 42 in the front view.

The supply port 62 is formed at the lower portion of the partition wall 42, and the discharge port 63 is formed at the upper portion of the partition wall 42. The supply port 62 is opened downward, while the discharge port 63 is opened upward. In the present embodiment, the supply port 62 and the discharge port 63 are located in the positions that are identical or substantially identical to each other in the lateral direction of the partition wall 42. That is, the supply port 62 and the discharge port 63 are located on the same vertical line or substantially on the same vertical line. The supply port 62 and the discharge port 63 are located to be shifted in the lateral direction with respect to the supply port 52 and the discharge port 53 of the outer plate 41, respectively.

As shown in FIGS. 1 and 3, the supply port 62 and the discharge port 63 are connected to the salt water supply unit 21. The supply port 62 is connected to the supply pipe 23, and the discharge port 63 is connected to the return pipe 25. The supply port 62 and the opening 61 are connected by a supply piping structure 64, and the opening 61 and the discharge port 63 are connected by a discharge piping structure 65. The supply piping structure 64 and the discharge piping structure 65 are formed on the respective outer plates 41 in a path shape. With these structures, salt water is supplied to the intermediate chamber 8 from the bottom, i.e., from the salt water supply unit 21 via the supply port 62 and the supply piping structure 64, and is discharged from the top via the discharge piping structure 65 and the discharge port 63. That is, the intermediate chamber 8 is configured such that salt water is supplied and discharged along the cathode side diaphragm 11 and the anode side diaphragm 12.

Figure 9:
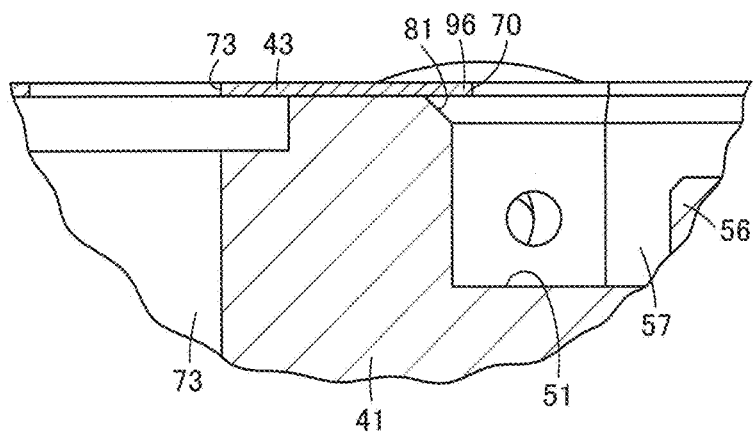
FIG. 9 is an enlarged cross-sectional view showing a part of the same producing device.
Figure 10:
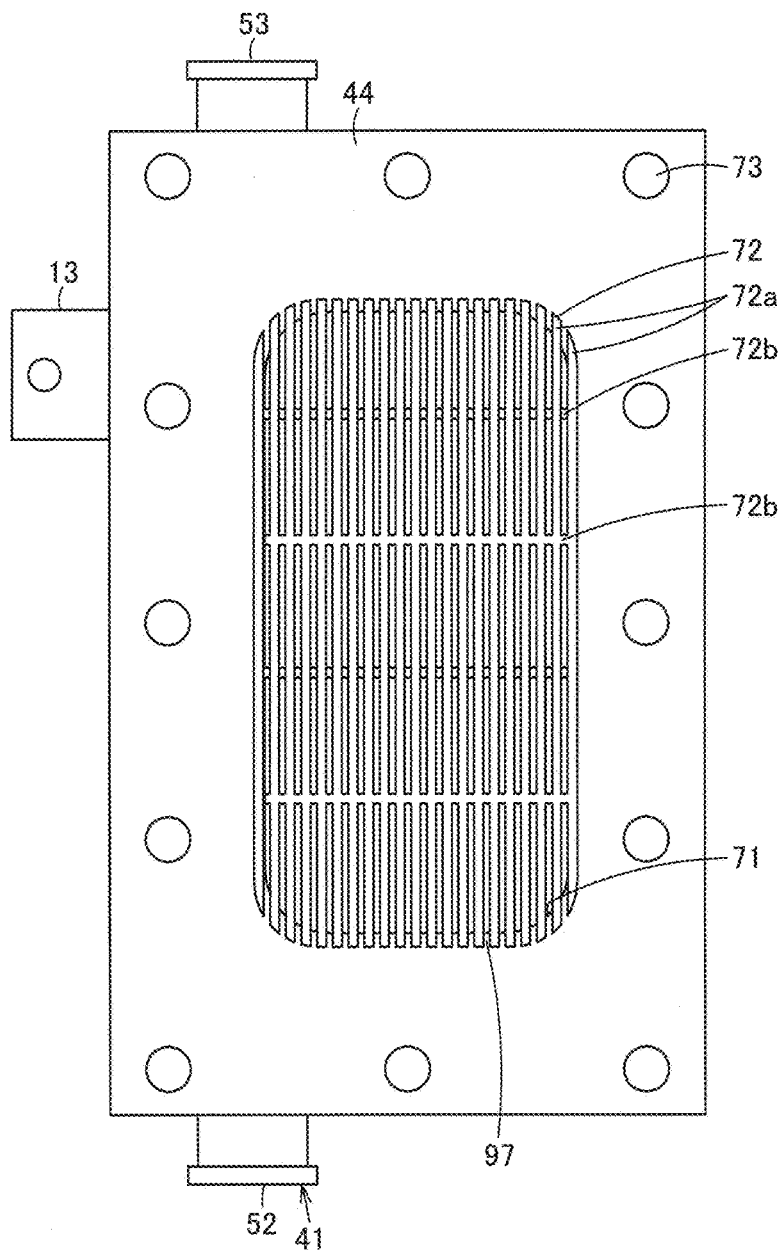
FIG. 10 is a front view showing a diaphragm protecting member of the same producing device.

The seal member 43 shown in FIG. 1 and FIGS. 7 to 9 and the seal member 44 shown in FIG. 10 watertightly close the gap between the outer plate 41 and the partition wall 42. The seal member 43 is disposed respectively between a peripheral edge of the cathode outer plate 41a and a peripheral edge of the cathode 13, between the cathode side diaphragm 11 and the partition wall 42, between the partition wall 42 and the anode side diaphragm 12, and between a peripheral edge of the anode 14 and a peripheral edge of the anode outer plate 41b. The seal member 44 is disposed between the peripheral edge of the seal member 43 and the peripheral edge of the partition wall 42 in an area between the cathode side diaphragm 11 and the partition wall 42 and an area between the anode side diaphragm 12 and the partition wall 42.

The seal member 43 is formed of rubber, elastic synthetic resin or the like, in a planar shape. The seal member 43 is formed to have a thickness of, for example, about 0.5 mm. In the present embodiment, the seal member 43 is formed to have a contour that is identical or substantially identical to that of each of the outer plate 41 and the partition wall 42 in the front view. In the present embodiment, the seal member 43 has its longitudinal direction oriented in the vertical direction. A hole 70 that penetrates the seal member 43 from its one side surface to the other side surface in the thickness direction is formed inside the seal member 43. By means of the hole 70, the seal member 43 is formed in a frame shape or picture frame-shape.

The hole 70 is formed with a size enough to expose the concave portion 51 of the outer plate 41 and the diaphragms 11 and 12 substantially as a whole. In the present embodiment, the hole 70 is formed in a substantially quadrilateral shape with its longitudinal direction oriented in the vertical direction. The hole 70 is disposed at the center of the seal member 43 in the front view.

Figure 11:
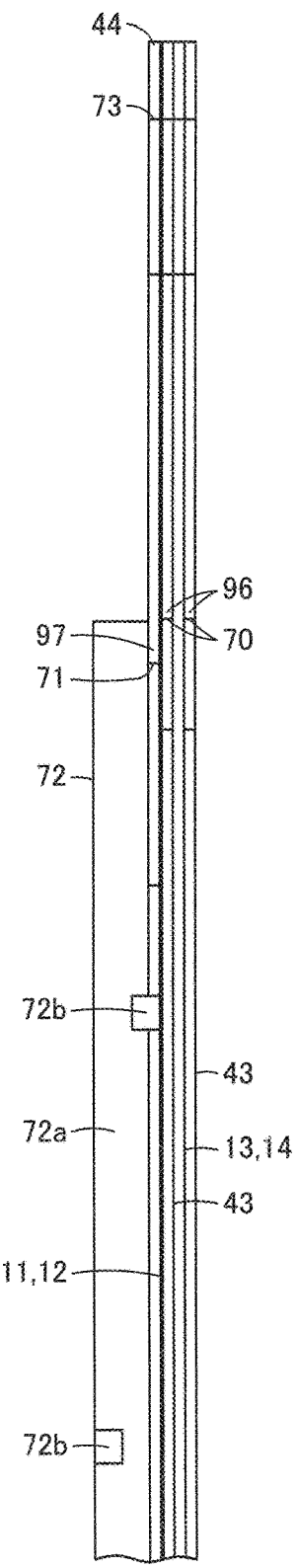
FIG. 11 is a longitudinal-sectional view showing a part of the same diaphragm protecting member.

The seal member 44 shown in FIGS. 10 and 11 is formed of a soft material, such as a fiber made of synthetic resin or the like, i.e., chemical fiber, in a planar shape. The seal member 44 is formed to have a thickness of, for example, about 0.5 mm. In the present embodiment, the seal member 44 is formed to have a contour that is identical or substantially identical to that of each of the outer plate 41, the partition wall 42, and the seal member 43 in the front view. In the present embodiment, the seal member 44 has its longitudinal direction oriented in the vertical direction. A hole 71 that penetrates the seal member 43 from its one side surface to the other side surface in the thickness direction is formed inside the seal member 44. A lattice-like diaphragm support portion 72 is formed in the hole 71.

Like the hole 70, the hole 71 is formed with a size enough to expose the diaphragms 11 and 12 substantially as a whole. In the present embodiment, the hole 71 is formed in a substantially quadrilateral shape with its longitudinal direction oriented in the vertical direction. The hole 71 is disposed at the center of the seal member 44 in the front view.

The diaphragm support portions 72 are portions that support the respective cathode side diaphragm 11 and anode side diaphragm 12 to stabilize their positions relative to the cathode 13 and the anode 14, maintaining stable electrolysis. The diaphragm support portion 72 is disposed on the partition wall 42 side of the hole 71 and inserted into the opening 61, i.e., the intermediate chamber 8. In the present embodiment, the diaphragm support portions 72 and 72 of the seal members 44 and 44 are located in close proximity to or in contact with each other in the intermediate chamber 8. The diaphragm support portion 72 integrally includes support main bodies 72a elongated along the vertical direction and coupling portions 72b coupling these support main bodies 72a.

The support main body 72a protrudes toward the partition wall 42 side with respect to the surface of the peripheral edge of the hole 71 in the seal member 44.

The coupling portion 72b couples the support main bodies 72a together such that the adjacent support main bodies 72a maintain a certain or substantially certain interval therebetween and are not deformed easily in their thickness direction. The coupling portions 72b are formed at a plurality of positions in the vertical direction, which is the longitudinal direction of the support main body 72a. The coupling portions 72b disposed side by side in the vertical direction are alternately arranged on the partition wall 42 side and on the diaphragm 11, 12 side opposite to the partition wall 42 side with respect to the support main body 72a. The coupling portion 72b has its thickness set smaller than that of the support main body 72a. The coupling portions 72b are configured to allow salt water to pass through the interior of the intermediate chamber 8 in the vertical direction in the opening 61 of the partition wall 42.

As shown in FIGS. 1 and 2, the cathode outer plate 41a, the seal member 43, the cathode 13, the seal member 43, the cathode side diaphragm 11, the seal member 44, the partition wall 42, the seal member 44, the anode side diaphragm 12, the seal member 43, the anode 14, the seal member 43, and the anode outer plate 41b are arranged to sequentially stack on top of each other in the thickness direction and press-fitted to each other in the thickness direction by fixing means to constitute the electrolytic bath 5. Examples of the fixing means include bolts and nuts. Bolts are inserted into through holes 73 formed in the peripheral edges of the cathode outer plate 41a, the seal member 43, the cathode 13, the seal member 43, the seal member 44, the partition wall 42, the seal member 44, the seal member 43, the anode 14, the seal member 43, and the anode outer plate 41b. Nuts are screwed onto the tips of the bolts and tightened thereto, causing the partition wall 42 to be press-fitted and held between the outer plates 41 and 41.

Here, in the present embodiment, the producing device 1 is provided with a diaphragm protecting structure that prevents damage to the cathode side diaphragm 11 and/or the anode side diaphragm 12.

The diaphragm protecting structure prevents damage to the cathode side diaphragm 11 and/or the anode side diaphragm 12 due to at least one of physical contact with each component, water pressure, or heat from the cathode 13 and/or the anode 14 during electrolysis.

The diaphragm protecting structure of a first example includes a chamfer 81 formed at a portion of the diaphragm protecting structure that contacts the cathode side diaphragm 11 and/or the anode side diaphragm 12 in the electrolytic bath 5. As shown in FIGS. 1 and 5, the chamfer 81 is a part that prevents damage to the cathode side diaphragm 11 and/or the anode side diaphragm 12 due to physical contact with the cathode side diaphragm 11 and/or the anode side diaphragm 12. For example, the chamfer 81 is formed on the edge (edge portion) of the concave portion 51 of the outer plate 41 and/or the corner (edge portion) of a portion of the branch portion 56 that faces the cathode side diaphragm 11 and/or the anode side diaphragm 12 or the like. Alternatively or additionally, the chamfer 81 may be formed at any position that can contact the cathode side diaphragm 11 and/or the anode side diaphragm 12, such as the edge of the opening 61 of the partition wall 42.

The diaphragm protecting structure of a second example includes at least one of the supply port 52 or the discharge port 53. Through the supply port 52, water is supplied to the cathode chamber 6 and/or the anode chamber 7 in the direction along the cathode side diaphragm 11 and/or the anode side diaphragm 12, i.e., in the vertical direction. Through the discharge port 53, the electrolyzed water is discharged from the cathode chamber 6 and/or the anode chamber 7 in the direction along the cathode side diaphragm 11 and/or the anode side diaphragm 12, i.e., in the vertical direction. That is, the supply port 52 and the discharge port 53 are parts that prevent damage to the cathode side diaphragm 11 and/or the anode side diaphragm 12 due to water pressure generated by the water flow in the direction intersecting the cathode side diaphragm 11 and/or the anode side diaphragm 12.

Similarly, the diaphragm protecting structure of a third example includes at least one of a supply port 62 or a discharge port 63. Through the supply port 62, salt water is supplied to the intermediate chamber 8 shown in FIGS. 1 and 6 in the direction along the cathode side diaphragm 11 and the anode side diaphragm 12, i.e., in the vertical direction. Through the discharge port 63, the salt water is discharged from the intermediate chamber 8 in the direction along the cathode side diaphragm 11 and the anode side diaphragm 12, i.e., in the vertical direction. That is, the supply port 62 and the discharge port 63 are parts that prevent damage to the cathode side diaphragm 11 and the anode side diaphragm 12 due to water pressure generated by the water flow in the direction intersecting the cathode side diaphragm 11 and the anode side diaphragm 12.

Furthermore, the diaphragm protecting structure of a fourth example includes three or more support portions capable of supporting the cathode side diaphragm 11 and/or the anode side diaphragm 12. In the present embodiment, the branch portion 56 shown in FIGS. 1, 4, and 5 functions as the support portion. The branch portion 56 is capable of supporting the cathode side diaphragm 11 and/or the anode side diaphragm 12 when electrolysis is performed by supplying water to the cathode chamber 6 and/or the anode chamber 7. By setting three or more branch portions 56 in the cathode chamber 6 and/or anode chamber 7, the strength of the branch portions 56 for supporting the cathode side diaphragm 11 and/or the anode side diaphragm 12 is distributed to prevent damage to the cathode side diaphragm 11 and/or the anode side diaphragm 12 due to physical contact thereof with the branch portions 56.

The diaphragm protecting structure of a fifth example includes the supply piping structure 54, which is a piping structure that supplies water uniformly or substantially uniformly to the branch flow path 57 between the branch portions 56 in the cathode chamber 6 and/or the anode chamber 7.

The supply piping structure 54 has an introduction pipe portion 83 that guides water flowing thereinto through the supply port 52 to the cathode chamber 6 and/or the anode chamber 7, and a plurality of branch pipe portions 84 that branch water from the introduction pipe portion 83 between the branch portions 56. The introduction pipe portion 83 is bent in a L shape from the supply port 52, which is located in a lower portion on one side in the lateral direction of the cathode chamber 6 and/or the anode chamber 7, and it is disposed along the lateral direction of the outer plate 41. The introduction pipe portion 83 has a certain or substantially certain flow path area. The branch pipe portions 84 are disposed in parallel or substantially in parallel to each other from the introduction pipe portion 83 in the vertical direction. The upper end of each branch pipe portion 84 communicates with a merging portion 59 in the position facing each branch flow path 57. The branch pipe portion 84 has a flow path area equal to or less than that of the introduction pipe portion 83, and is formed so that its flow path area becomes larger as the branch pipe portion 84 is located further from the supply port 52. Therefore, the supply piping structure 54 is configured to distribute the water, which has flowed in from the supply port 52, uniformly or substantially uniformly to the branch flow paths 57 between the branch portions 56 from the introduction pipe portion 83 toward each branch pipe portion 84. The supply piping structure 54 is a part that prevents damage to the cathode side diaphragm 11 and/or the anode side diaphragm 12 due to water pressure.

The diaphragm protecting structure of a sixth example includes the discharge piping structure 55, which is a piping structure that discharges electrolyzed water uniformly or substantially uniformly from the branch flow path 57 between the branch portions 56 in the cathode chamber 6 and/or the anode chamber 7.

The discharge piping structure 55 has a plurality of branch pipe portions 86 that discharges electrolyzed water from the cathode chamber 6 and the anode chamber 7 and a leading pipe portion 87 that merges the electrolyzed water form these branch pipe portions 86 to guide the merged water to the discharge port 53. The branch pipe portions 86 are disposed in parallel or substantially in parallel to each other along the vertical direction. The lower end of the branch pipe portion 86 communicates with the merging portion 59 in the position facing the branch flow path 57. The branch pipe portion 86 has a flow path area equal to or less than that of the leading pipe portion 87, and is formed so that its flow path area becomes larger as the branch pipe portion 86 is located further from the supply port 53. The leading pipe portion 87 is bent in a L shape and disposed along the lateral direction of the outer plate 41 to communicate with the discharge port 53, which is located in an upper portion on one side in the lateral direction of the cathode chamber 6 and the anode chamber 7. Each branch pipe portion 86 is connected to the leading pipe portion 87. Thus, the discharge piping structure 55 is configured to uniformly or substantially uniformly discharge the electrolyzed water in the cathode chamber 6 and/or the anode chamber 7 from the branch flow paths 57 between the branch portions 56 to the discharge port 53 through the merging portion 59. The discharge piping structure 55 is a part that prevents damage to the cathode side diaphragm 11 and/or the anode side diaphragm 12 due to water pressure.

Further, the diaphragm protecting structure of a seventh example includes the supply piping structure 64 and the discharge piping structure 65, which are piping structures that cause salt water to uniformly or substantially uniformly flow to the positions of the intermediate chamber 8 shown in FIG. 6 that correspond to the branch flow paths 57 of the cathode chamber 6 and the anode chamber 7.

The supply piping structure 64 has an introduction pipe portion 90 that guides salt water flowing in through the supply port 62 to the intermediate chamber 8, and a plurality of branch pipe portions 91 that branch salt water from the introduction pipe portion 90 to the position corresponding to each area between the branch portions 56. The structures of these introduction pipe portion 90 and branch pipe portions 91 are the same as those of the introduction pipe portion 83 and branch pipe portions 84 of the supply piping structure 54, and thus a detailed description thereof is omitted.

The discharge piping structure 65 has a plurality of branch pipe portions 93 that discharges the salt water from the intermediate chamber 8, and a leading pipe portion 94 that merges the salt water from these branch pipe portions 93 to guide the merged salt water to the discharge port 63. The structures of these branch pipe portions 93 and leading pipe portion 94 are the same as those of the branch pipe portions 86 of the discharge piping structure 55 and the leading pipe portion 87, and thus a detailed description thereof is omitted.

The diaphragm protecting structure of an eighth example includes a protrusion 96 formed to protrude into the cathode chamber 6 and/or the anode chamber 7 from the seal member 43 beyond the edge of the concave portion 51 as shown in FIG. 9. The protrusion 96 is a part that inhibits the direct contact of the edge of the concave portion 51 with the cathode side diaphragm 11 and/or the anode side diaphragm 12 (FIG. 1). That is, the protrusion 96 is a part that prevents damage to the cathode side diaphragm 11 and/or the anode side diaphragm 12 (FIG. 1) due to physical contact with the cathode side diaphragm 11 and/or the anode side diaphragm 12 (FIG. 1). The protrusion 96 constitutes the edge of the hole 70 and protrudes inside the cathode chamber 6 and/or the anode chamber 7 beyond the edge of the concave portion 51 by a predetermined distance, for example, 1 mm. As for the seal member 44 shown in FIGS. 10 and 11, a protrusion 97 may be provided at the edge of the hole 71 so as to protrude from the edge of the opening 61 (FIG. 1) in the same manner.

Furthermore, the diaphragm protecting structure of a ninth example includes a seal member 44 that holds the cathode side diaphragm 11 and/or the anode side diaphragm 12 in the position close to the cathode 13 and/or the anode 14. In the present embodiment, the seal member 44 has the diaphragm support portion 72 interposed between the partition wall 42 and the cathode side diaphragm 11 and/or the anode side diaphragm 12, thereby fixing the cathode side diaphragm 11 and/or the anode side diaphragm 12 to the position close to the cathode 13 and/or the anode 14. Thus, the position of the cathode side diaphragm 11 and/or the anode side diaphragm 12 during the electrolysis is stabilized to prevent vibration of the cathode side diaphragm 11 and/or the anode side diaphragm 12. Additionally, the burning of the cathode side diaphragm 11 and/or the anode side diaphragm 12 due to contact with the cathode 13 and/or anode 14 is prevented. That is, the seal member 44 is a diaphragm protecting member that prevents damage to the cathode side diaphragm 11 and/or the anode side diaphragm 12 due to heat from the cathode 13 and/or the anode 14 during the electrolysis.

Figure 12:
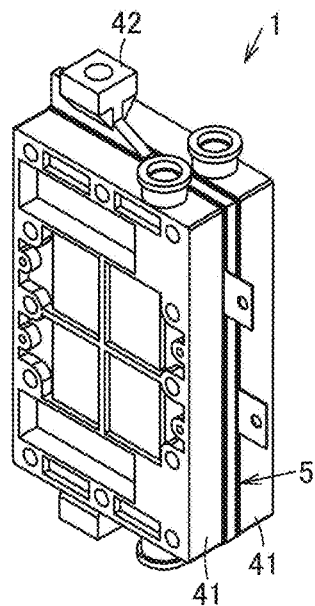
FIG. 12A is a perspective view showing an example of the same producing device.
FIG. 12B is a perspective view showing another example of the same producing device.
Figure 12:
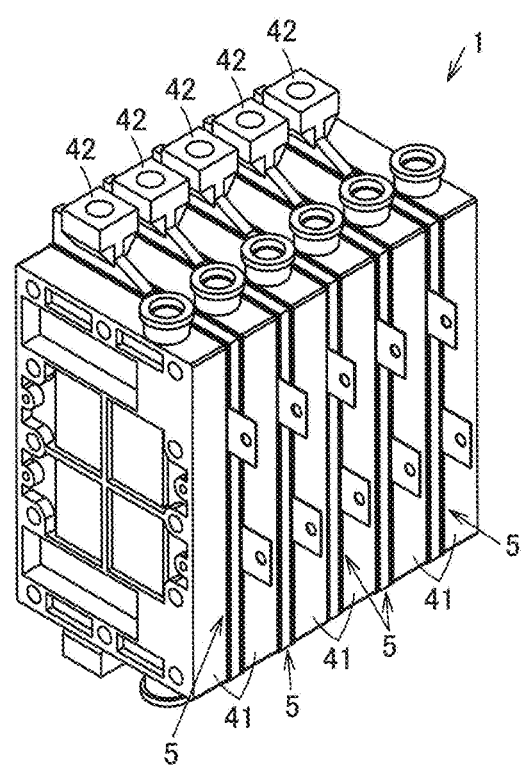

The producing device 1 may include one electrolytic bath 5 for a water supply source as shown in FIG. 12A or may include a plurality of electrolytic baths 5 arranged in parallel to the water supply source as shown in FIG. 12B. In an example shown in FIG. 12B, the outer plates 41 and the partition walls 42 are alternately arranged to constitute a plurality of electrolytic baths 5 continuously stacked on top of each other. In this case, the outer plate 41 located between the partition walls 42 has, on its both side surfaces, the concave portions 51 (FIG. 1) for forming the chambers, with one concave portion 51 at each side. When the plurality of electrolytic baths 5 is stacked, it is preferable to provide a throttle for each electrolytic bath 5 so that the water flowing into the chambers 6, 7, and 8 and the water discharging from the chambers 6, 7, and 8 are uniform or substantially uniform. Further, it is preferable that an abnormality detection device is installed in each electrolytic bath 5 to detect abnormalities such as leakage of salt water due to damage to the cathode side diaphragm 11 and/or the anode side diaphragm 12 based on the electrical properties of the electrolyzed water, such as resistance value, so that the detection device can discover which electrolytic bath 5 has an abnormality in the cathode side diaphragm 11 and/or the anode side diaphragm 12.

Thus, according to the first embodiment, the damage to the cathode side diaphragm 11 and/or the anode side diaphragm 12 can be prevented by including the diaphragm protecting structure. Therefore, the service life of the cathode side diaphragm 11 and/or the anode side diaphragm 12 can be extended, enabling the production of electrolyzed water at low cost with less frequent maintenance of the cathode side diaphragm 11 and/or the anode side diaphragm 12 or the like of the producing device 1.

The diaphragm protecting structure prevents damage to the cathode side diaphragm 11 and/or the anode side diaphragm 12 due to at least one of physical contact, water pressure, or heat from the electrode during electrolysis. By providing this structure, the producing device 1 can surely protect the cathode side diaphragm 11 and/or the anode side diaphragm 12 from the physical contact that could be caused during supply or discharge of water or electrolysis, or the like, excessive water pressure, or heat from the electrode; the producing device 1 produces and discharges electrolyzed water through the electrolysis using the cathode side diaphragm 11 and the anode side diaphragm 12 by supplying water to the cathode chamber 6 and the anode chamber 7 while supplying salt water to the intermediate chamber 8.

Specifically, the diaphragm protecting structure includes the chamfer 81 formed at the portion of the electrolytic bath 5 that contacts the cathode side diaphragm 11 and/or the anode side diaphragm 12, thereby making it possible to prevent damage to the cathode side diaphragm 11 and/or the anode side diaphragm 12 due to physical contact with the cathode side diaphragm 11 and/or the anode side diaphragm 12.

The diaphragm protecting structure includes at least one of the supply port 52 or the discharge port 53. Through the supply port 52, the electrolytic raw water is supplied to the cathode chamber 6 and/or the anode chamber 7 in the direction along the cathode side diaphragm 11 and/or the anode side diaphragm 12. Through the discharge port 53, the electrolyzed water is discharged from the cathode chamber 6 and/or the anode chamber 7 in the direction along the cathode side diaphragm 11 and/or the anode side diaphragm 12. By including this structure, water pressure (load) applied to the cathode side diaphragm 11 and/or the anode side diaphragm 12 can be suppressed, thereby preventing damage to the cathode side diaphragm 11 and/or the anode side diaphragm 12.

By disposing the supply port 52 at the lower portion of the outer plate 41 as well as the discharge port 53 at the upper portion of the outer plate 41, the outer plates 41 and the partition walls 42 can be stacked on top of each other in their thickness direction. Thus, a number of outer plates 41 and partition walls 42 can be stacked on top of each other to make the plurality of electrolytic baths 5 compact.

The diaphragm protecting structure includes three or more branch portions 56 formed in the cathode chamber 6 and/or the anode chamber 7 and capable of supporting the cathode side diaphragm 11 and/or the anode side diaphragm 12, which makes the space between the branch portions 56 and 56 (the branch flow path 57) narrower and strongly supports the cathode side diaphragm 11 and/or the anode side diaphragm 12 using the branch portions 56 by forming the branch portion 56 itself in a relatively elongated shape. Further, the load onto the cathode side diaphragm 11 and/or the anode side diaphragm 12 can be dispersed to prevent damage to the cathode side diaphragm 11 and/or the anode side diaphragm 12 due to water pressure or the like.

By forming the branch portions 56 in the shape of ribs parallel to each other, while the cathode side diaphragm 11 and/or the anode side diaphragm 12 can be supported effectively, water flowing in the cathode chamber 6 and/or the anode chamber 7 and electrolyzed water discharged from the cathode chamber 6 and/or the anode chamber 7 can be guided by the branch portions 56 along the cathode side diaphragm 11 and/or the anode side diaphragm 12, respectively, thereby allowing the water and the electrolyzed water to flow efficiently.

The diaphragm protecting structure includes the piping structures such as the discharge piping structure 55 and the supply piping structure 54 for uniformly supplying water between the branch portions 56 inside the cathode chamber 6 and/or the anode chamber 7, thus suppressing unevenness of the water pressure to the cathode side diaphragm 11 and/or the anode side diaphragm 12 between the branch portions 56, which can further prevent damage to the cathode side diaphragm 11 and/or the anode side diaphragm 12. By providing three or more branch portions 56, even though the space (branch flow path 57) between the branch portions 56 and 56 is made narrow, water is dispersed in such a space uniformly or substantially uniformly, which allows the water to flow easily, ensuring the process performance of the producing system.

The diaphragm protecting structure includes the protrusion 96 formed to protrude into the cathode chamber 6 and/or the anode chamber 7 from the seal member 43 watertightly closing the gap between the outer plate 41 and the partition wall 42, beyond the edge of the concave portion 51, thereby making it possible to prevent damage to the cathode side diaphragm 11 and/or the anode side diaphragm 12 due to physical contact of the edge of the concave portion 51 with the cathode side diaphragm 11 and/or the anode side diaphragm 12.

The plurality of electrolytic baths 5 is disposed in parallel to the water supply source, so that the purification capacity of the producing device for the electrolyzed water can be increased to about 5 to 10 L/min.

The diaphragm protecting structure includes the seal member 44 formed of fiber and serving as a sheet-shaped diaphragm protecting member that fixes the position of the cathode side diaphragm 11 and/or the anode side diaphragm 12, thereby making it possible to prevent burning, i.e., damage to the cathode side diaphragm 11 and/or the anode side diaphragm 12 due to heat from the cathode 13 and/or the anode 14 during electrolysis.

Figure 13:
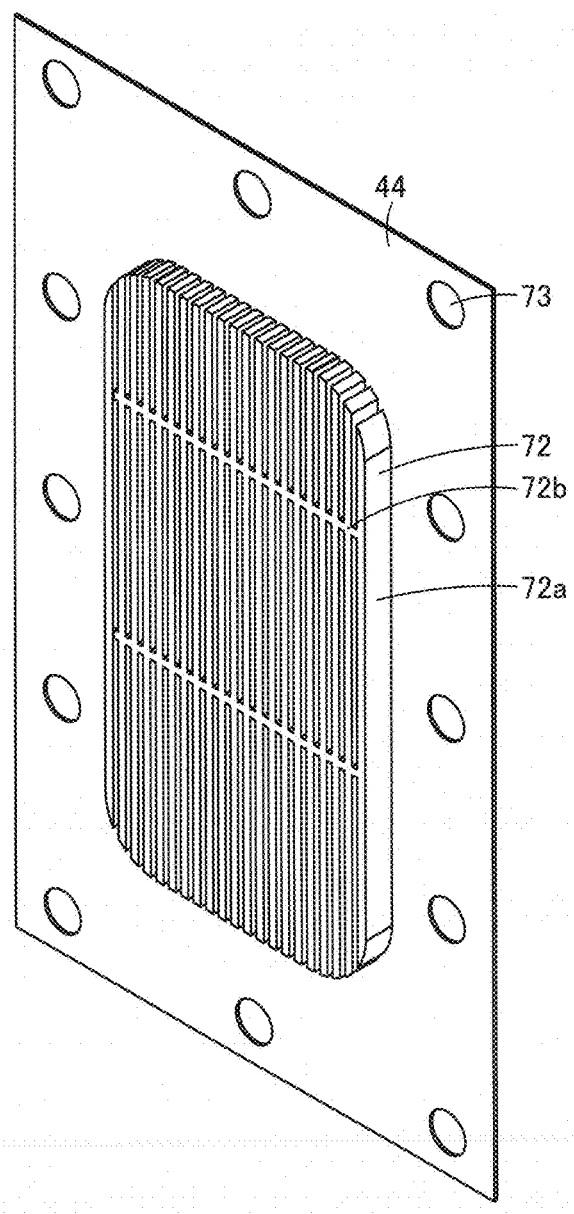
FIG. 13 is a perspective view showing a seal member of a producing device according to a second embodiment.

Although in the above first embodiment, the seal member 44 is disposed between the partition wall 42 and each of the diaphragms 11 and 12, the present invention is not limited thereto. As in the second embodiment shown in FIG. 13, by setting the diaphragm support portion 72 thicker, for example, about twice thicker, than that in the first embodiment, even when the seal member 44 is disposed between one of the diaphragms 11 and 12 and the partition wall 42, and the diaphragm support portion 72 is disposed to come out of the opening 61 and to be located in close proximity to the other of the diaphragms 11 and 12, this configuration can also function as the diaphragm protecting member in the same manner.

In each of the above embodiments, the vertical relationship between the supply port 52, 62 and the discharge port 53, 63 may be set in reverse. That is, the supply port 52, 62 may be disposed in the upper portion, while the discharge port 53, 63 may be disposed in the lower portion.

The invention claimed is:

1. A producing device that produces electrolyzed water using a pair of electrodes supplied with power and a diaphragm, the producing device comprising:
   an electrolytic bath having a plurality of chambers partitioned via the diaphragm and a diaphragm protecting structure for preventing damage to the diaphragm;
   wherein the electrolytic bath includes:
   a pair of cover members each having a concave portion by which the chambers are compartmentalized from each other;
   a partition wall having an opening by which the chambers are compartmentalized from each other, the partition wall being sandwiched between the cover members via the electrodes and the diaphragm; and
   a seal member that watertightly closes a gap between the cover member and the partition wall, and
   wherein the diaphragm protecting structure includes a protrusion formed to protrude from the seal member into at least one chamber of the plurality chambers beyond an edge of of at least one concave portion of the pair of cover members, or an edge of the opening of the partition wall.

2. The producing device according to claim 1, wherein the diaphragm protecting structure includes a chamfer formed at a portion of the electrolytic bath that contacts the diaphragm.

3. The producing device according to claim 1, wherein the diaphragm protecting structure includes at least one of a supply port through which water is supplied to the chamber in a direction along the diaphragm and a discharge port through which water is discharged from the chamber in the direction along the diaphragm.

4. The producing device according to claim 1, wherein the diaphragm protecting structure includes three or more support portions formed in at least one of the chambers of the plurality of chambers and capable of supporting the diaphragm.

5. The producing device according to claim 4, wherein the support portions are formed in shape of ribs parallel to each other.

6. The producing device according to claim 5, wherein the diaphragm protecting structure includes a piping structure that uniformly supplies electrolytic raw water between the support portions inside the chamber.

7. The producing device according to claim 1, wherein the diaphragm protecting structure includes a sheet-shaped diaphragm protecting member formed of fiber and fixing a position of the diaphragm.

8. The producing device according to claim 1, wherein tig electrolytic bath is one of a plurality of electrolytic baths, and the plurality of electrolytic baths are arranged in parallel to a water supply source.

* * * * *